United States Patent
Walling

(10) Patent No.: US 9,778,145 B2
(45) Date of Patent: Oct. 3, 2017

(54) ENGINE PROBE SYSTEM

(71) Applicant: Weston Aerospace Limited, Farnborough, Hampshire (GB)

(72) Inventor: Paul Walling, Farnborough (GB)

(73) Assignee: WESTON AEROSPACE LIMITED, Hampshire (GB)

( * ) Notice: Subject to any disclaimer, the term of this patent is extended or adjusted under 35 U.S.C. 154(b) by 205 days.

(21) Appl. No.: 14/597,368

(22) Filed: Jan. 15, 2015

(65) Prior Publication Data
US 2015/0198504 A1 Jul. 16, 2015

(30) Foreign Application Priority Data
Jan. 16, 2014 (GB) .................... 1400709.0

(51) Int. Cl.
*G01M 15/14* (2006.01)
*G01B 7/14* (2006.01)

(52) U.S. Cl.
CPC ............... *G01M 15/14* (2013.01); *G01B 7/14* (2013.01)

(58) Field of Classification Search
CPC ................................. G01B 7/14; G01M 15/14
See application file for complete search history.

(56) References Cited

U.S. PATENT DOCUMENTS

| | | |
|---|---|---|
| 2,842,738 A | 4/1956 | Warnick |
| 4,950,080 A | 8/1990 | Boulloy et al. |
| 5,119,036 A | 6/1992 | Rickards et al. |
| 5,166,626 A * | 11/1992 | Hester ............ G01B 7/14 324/683 |
| 5,892,365 A * | 4/1999 | Bailleul ........... G01B 7/14 324/662 |
| 5,973,502 A * | 10/1999 | Bailleul ........... G01B 7/14 324/662 |
| 8,344,741 B2 * | 1/2013 | Sheikman ........ G01B 7/14 324/658 |
| 8,513,960 B2 * | 8/2013 | Schneider ....... G01B 7/14 324/690 |
| 8,770,033 B2 * | 7/2014 | Roziere .......... G01D 5/24 73/718 |
| 9,417,048 B2 * | 8/2016 | Esler ............. G01B 7/14 |
| 2010/0097079 A1 * | 4/2010 | Sheikman ........ G01B 7/14 324/686 |
| 2012/0132006 A1 * | 5/2012 | Roziere .......... G01D 5/24 73/724 |

FOREIGN PATENT DOCUMENTS

EP 0334441 A1 9/1989
WO 9740340 A1 10/1997

* cited by examiner

*Primary Examiner* — Freddie Kirkland, III
(74) *Attorney, Agent, or Firm* — Fredrikson & Byron, P.A.

(57) ABSTRACT

An engine probe system for monitoring a moving engine element. The probe system includes a capacitive sensor (1) including a sensing electrode (5) defining one of the electrodes of a capacitor and an output lead for coupling the sensing electrode (5) to data processing means for monitoring changes in the capacitance of the capacitor including the sensing electrode. The output lead includes a first conductor for connecting the sensing electrode to the data processing means, an insulation jacket surrounding the first conductor, and a flexible conduit (11) surrounding the insulation jacket and defining a fluid passage between the insulation jacket and the flexible conduit.

13 Claims, 4 Drawing Sheets

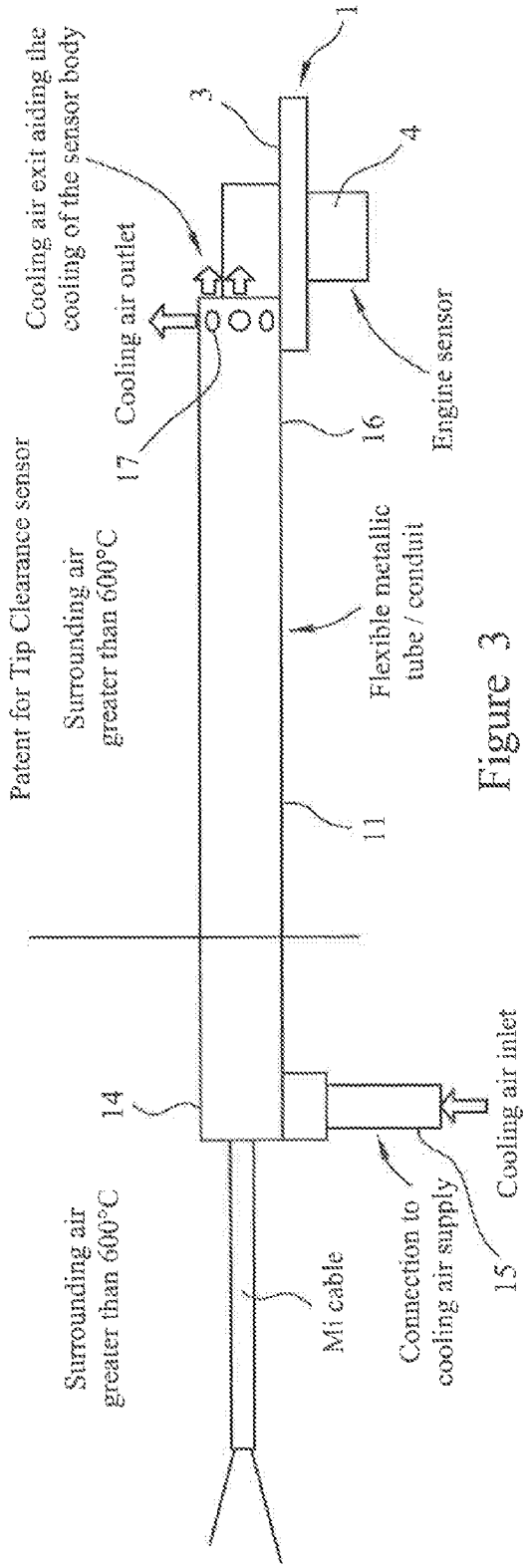
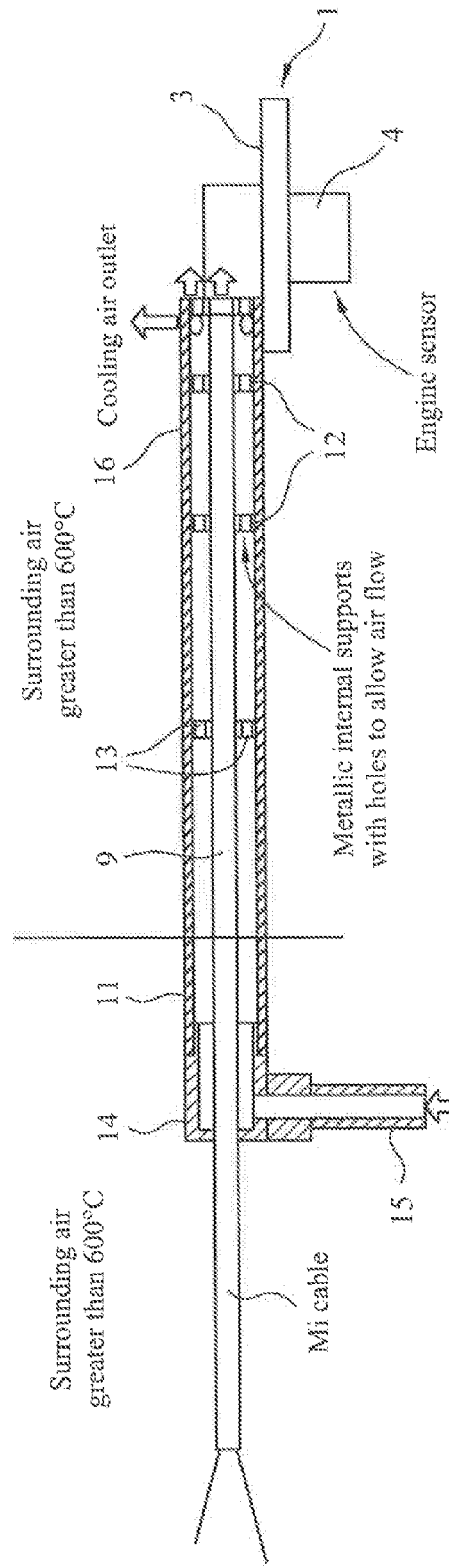

ENGINE PROBE SYSTEM

The invention relates to an engine probe system for monitoring a moving engine element. Particular embodiments of the invention can be used to monitor moving elements in turbo machines operating at high temperatures: for example, blades in gas turbines (including jet engines).

Capacitive probes to monitor turbo machinery blades are known.

EP 334 441 and U.S. Pat. No. 4,950,080 describe a capacitive sensor arrangement for a turbo-machine in which a conductive surface is fixed to the machine casing near a succession of rotating blades to form the first plate of a capacitor. The second plate or electrode of the capacitor consists, in succession, of each one of the ends of the rotating blades when those ends pass close to the conductive surface defining the first capacitor plate or electrode. The blades are monitored by monitoring changes in the capacitance of the capacitor formed by the first surface and the succession of blade ends.

In an alternative capacitive sensor arrangement described in, for example, WO 97/40340 and used in the TURBO-COAX (trade mark) range of capacitive sensors sold by Thermocoax S.A.S., a capacitor is formed by coaxial separated electrodes at an end of a sensor fixed to the machine casing near the path of the blades. Movement of successive blades past the end of the capacitive sensor alters the capacitance of the capacitor due to the fringe field effect. The magnitude of the change in the capacitance of the sensor is a function of the distance from the sensor to the respective passing blade so capacitive sensors are particularly useful for monitoring blade tip clearance in turbo-machinery.

Capacitive sensors can be used at high temperatures. However their signal output is low which means that noise can dramatically affect the quality of the signal and accuracy of any measurements derived from a capacitive sensor.

Capacitive blade tip clearance sensors can be insulated to reduce the temperature effects at the sensor. U.S. Pat. No. 2,842,738 and U.S. Pat. No. 5,119,036 disclose capacitance or capacitive sensors with cooling arrangements for cooling the sensor.

The inventor of the subject application is the first to realise that although the known capacitive sensor constructions are designed to deal with the very high temperatures in or on the engine casing itself where the sensing capacitive sensor is located, further previously unrecognised errors arise from the lower but still high temperature environment in which are placed the connections running from the capacitive sensor itself to the data processing which monitors the changes in capacitance caused by the rotating blades.

It is known that gas turbines are getting hotter and hotter in order to achieve the engine efficiencies that are required. These higher temperatures result in the engine sensors needing to operate at ever increasing temperatures. For a sensor to operate above 260° C., mineral insulated ("MI") cable is predominantly used, which consists of a tubular metallic oversheath and one or more internal conductors which are insulated from the sheath and from each other by the use of compacted insulating powder. The insulating powder is typically magnesium oxide or Silicon dioxide.

When the MI cable is heated the structural integrity is affected to some extent, however the electrical performance is affected to a greater extent. As the temperature goes up the electrical resistance of the circuit increases while the insulation resistance between the conductor/s and case and between conductors reduces as shown in the graph of FIG. 1.

In addition to the reduction of insulation resistance, the capacitance of the cable increases as shown in the graph of FIG. 2.

For most sensor applications that use MI cable, this change in insulation resistance and capacitance does not have a significant effect. However this is not the case when the cable is attached to a capacitance or capacitive sensor that may be used for measurement of turbine blade tip clearance.

The change in capacitance that is generated as the blade passes the tip clearance sensor is small or comparable in magnitude when compared to the increase in capacitance of the MI cable that is generated from the increase in temperature. The electronics that drive the capacitance sensor can cope with minor changes in capacitance. However if the driving electronics are modified to cope with a larger total system capacitance then the required measurement accuracy is lost. The large change in capacitance that occurs around 600° C. in the embodiment shown in FIG. 2 cannot be accommodated by the electronics without loss of accuracy and therefore the MI cable should not be subjected to temperatures above 600° C. Different cable constrictions will have different temperatures at which the capacitance is significantly affected.

The temperature effect on capacitance can prevent this capacitance sensor technology being used in certain application or engine locations, or seriously affect the accuracy of sensors including such arrangements.

The present invention provides an engine probe system for monitoring a moving engine element, the system including: a capacitive engine sensor including a sensing electrode defining one of the electrodes of a capacitor; and an output lead for coupling the engine sensor to data processing means for monitoring changes in the capacitance of the capacitor including the sensing electrode, wherein the output lead includes a first end coupled to the engine sensor, a first conductor for electrically connecting the sensing electrode to the data processing means, and an insulation jacket surrounding at least a portion of the first conductor, and wherein the engine probe system includes a conduit surrounding at least a portion of the output lead insulation jacket and defining a fluid passage between the insulation jacket and the conduit.

The presence of a fluid passage within the conduit allows a cooling fluid to be passed over the output lead insulation jacket enclosing the conductor and thereby cooling the conductor. This cooling fluid reduces the effects of the high temperatures found outside but near an engine on the capacitance of the conducting wires outside the engine casing and connecting the sensor with data processing means. The cooling fluid reduces fluctuations in temperature that cause fluctuations in capacitance within the wires carrying sensing signals from the sensor to the remote data processing apparatus. These fluctuations mask the much smaller variable capacitance signals from the sensor that indicate the passing of blades, so it is desirable to minimise them. The conduit is separate from the engine sensor, or sensor head itself (i.e. the unit or element enclosing and including the sensing electrode(s) and for placing on or in the engine casing).

Preferably, an engine probe system wherein the conduit is a flexible tube.

This allows the output lead to be flexible and easily configured to the layout of a specific engine casing, while still providing continual cooling means in the form of a cooling fluid passing over the output lead(s).

Preferably, an engine probe system wherein the capacitive sensor includes a centre first electrode coaxial with and separated from an outer electrode, the centre and outer electrodes defining the electrodes of the capacitor, and the output lead including a second conductor for connecting the outer electrode to the data processing means, and wherein the insulation jacket surrounds the second conductor.

This arrangement allows the outer electrode to be contained within the same insulating jacket so that both electrodes benefit from the cooling effects of the cooling fluid.

Preferably, an engine probe system wherein the second conductor connects the outer electrode to ground.

When this second conductor is grounded, any voltage applied to the central first electrode creates an electric field between the electrodes. Only the voltage supplied to one electrode need be controlled to obtain accurate capacitance measurements.

Preferably, an engine probe system wherein the conductor or conductors, and the insulation jacket are formed by mineral insulated (MI) cable.

These cables provide insulating layers to separate conductors from the outer jacket. This avoids adverse effects that could arise from the conductor being exposed to other metal or high temperature elements. The material insulation is densely packed and robust, ensuring the position of the three conductors within the jacket. This type of cable is also cheap and effective for this type of use.

Preferably, an engine probe system wherein the conduit is spaced from the insulation jacket by spacer elements.

This prevents the insulation jacket from touching the flexible conduit. The conduit may be at a high temperature as it is made of metal and in constant contact with the environment surrounding the engine. It also allows the cooling fluid to flow along the entire length and circumference of the insulation jacket, maximising the cooling effects.

Preferably, an engine probe system wherein the spacer elements between the flexible conduit and the insulation jacket have apertures therethrough to allow the passage of a fluid.

This ensures the path of any fluid used for cooling is unobstructed along the entire length and circumference of the insulation jacket, without compromising the stability of the structure.

Preferably, an engine probe system wherein the conduit is a metal tube.

This gives the conduit structural stability and it is well known that metallic materials are better suited to high temperature usage than many others.

Preferably, an engine probe system wherein the conduit includes a fluid inlet at a first conduit portion distal from the sensor, and a fluid outlet at a second conduit portion proximal to the sensor.

In this arrangement, a cooling fluid is lead through the passage defined by the conduit to best cool the cable running through it. A distal inlet minimises problems in the supply of cooling fluid that may arise from the high temperatures at the sensor end of the probe, as it is here that the engine temperatures are highest to increase efficiency.

Preferably, an engine probe system according wherein the outlet is arranged so cooling fluid exiting therefrom passes over the sensor.

This arrangement provides a secondary cooling effect of the cooling fluid. As the fluid exits the conduit it may flow over the sensor or sensor casing, cooling the sensor as well as cooling the cable transmitting the signals from it.

The invention in a second aspect provides an output lead for an engine probe including a capacitive sensor, wherein the output lead includes a first end coupled to the engine probe, a first conductor for electrically connecting the sensor sensing electrode to data processing means, and an insulation jacket surrounding at least a portion of the first conductor, and a conduit surrounding at least a portion of the output lead insulation jacket and defining a fluid passage between the insulation jacket and the conduit.

The invention in a third aspect provides a conduit for the output lead from an engine probe including a capacitive sensor, and wherein the conduit defines a fluid passage for coolant around the output lead.

It shall be appreciated that any features described with reference to one aspect of the present invention are equally applicable to any other aspect of the invention.

Embodiments of the invention allow a cooling fluid such as cooling air to flow within a flexible tube over the outside of the conductor of the leads from and/or to the engine sensor and thereby keep the conductor taking signals from the capacitive sensor to the data processing means cool and reduce the changes in the capacitance of the sensor output lead which affect the accuracy of the probe measurements.

A preferred embodiment of the invention will now be described by way of non-limiting example with reference to the attached figures in which:

FIG. 3 is a schematic side view of a probe system or arrangement embodying the invention;

FIG. 4 is a schematic cross-section through the probe system illustrated in FIG. 3;

Figures 7A, 7B:
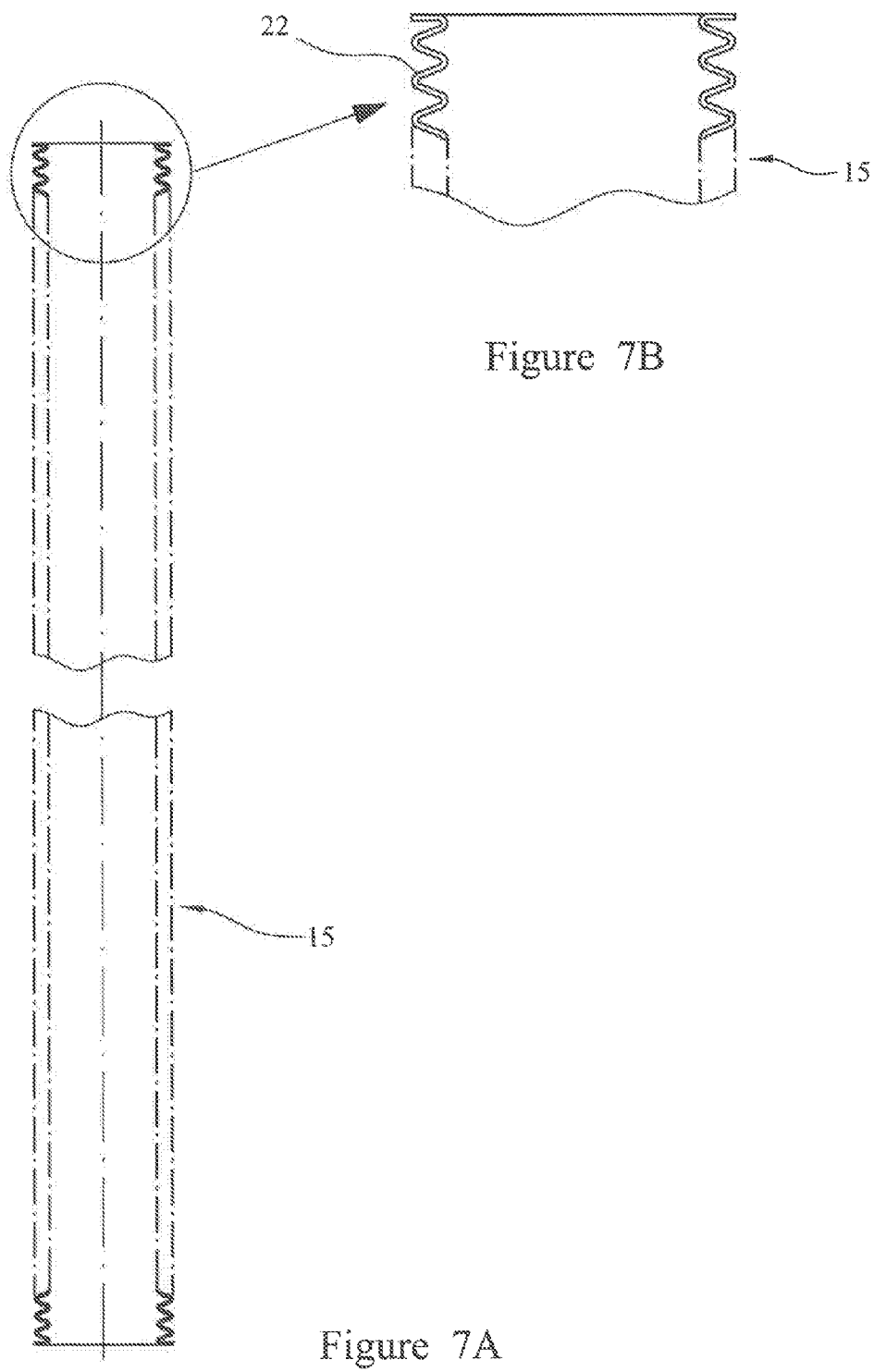

FIG. 7*a* is a schematic illustration of the construction of the conduit used in the probe system shown in FIGS. 3 and 4; and FIG. 7*b* is a detailed illustration of a portion of FIG. 7*a*.

Referring to FIGS. 3 and 4, a tip clearance capacitive sensor 1 may be mounted on an engine casing 2 (not shown). The tip clearance sensor has a flange 3 for fixing to the engine casing 2. The sensing end 4 of the sensor includes a capacitive sensing arrangement. The sensor construction is known and not a novel or inventive part of the invention so will not be described in detail. A suitable capacitive sensor would be one of the sensors supplied by Thermocoax S.A.S. under the TURBOCOAX trade mark whose construction is illustrated in FIG. 5.

Figure 1:
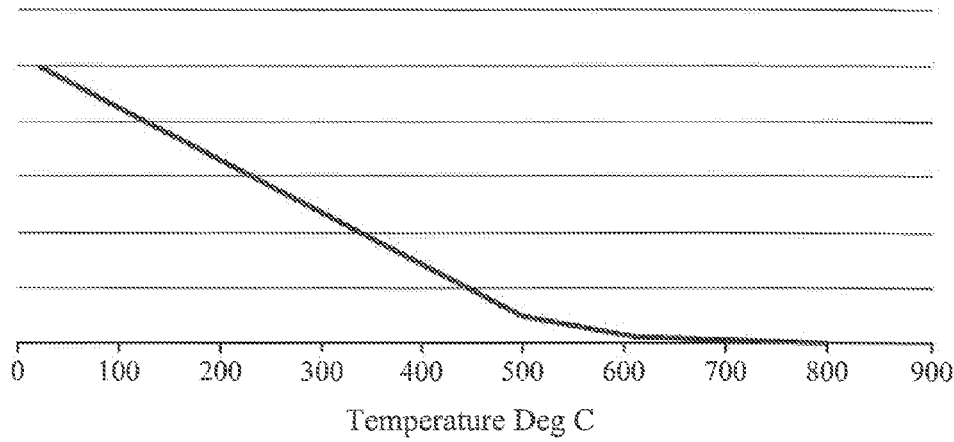
FIG. 1 is a graph illustrating the change of insulation resistance with temperature of the insulation surrounding the conductor of a mineral insulator output lead.
Figure 2:
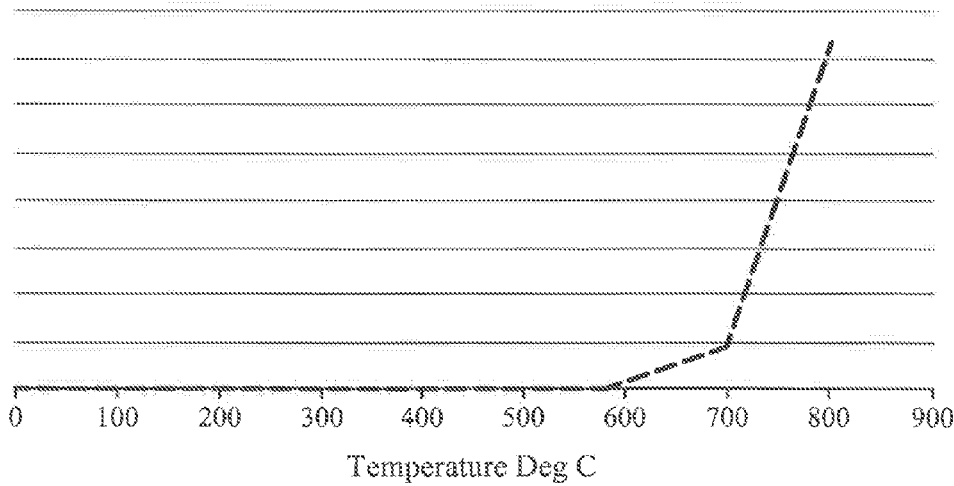
FIG. 2 is a graph illustrating the change in capacitance with temperature of the output lead.
Figure 5:
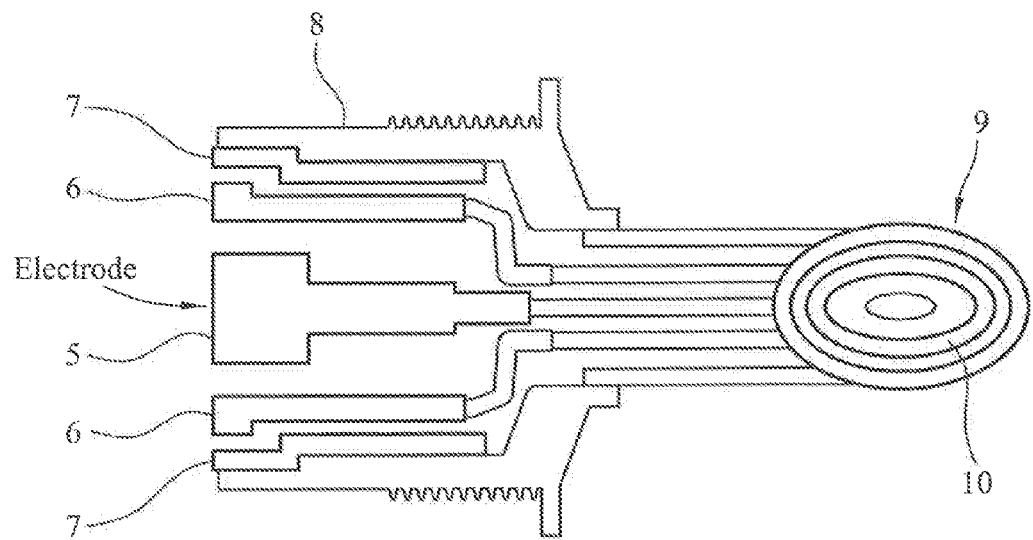
FIG. 5 is a cross-sectional illustration of a possible capacitive sensor construction suitable for use with the probe shown in FIGS. 3 and 4.
Figure 6:
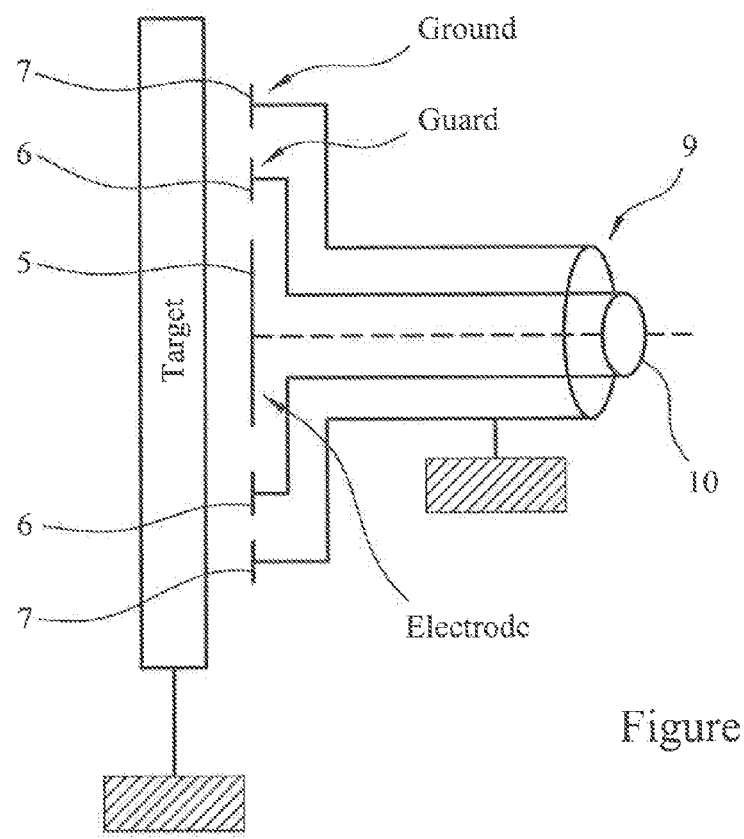
FIG. 6 is a partial circuit diagram illustrating the capacitor forming the capacitive sensor of FIG. 5.

The capacitive sensor comprises a centre electrode 5 extending from the centre of the triaxial MI cable 9, as shown in FIGS. 5 and 6. This is surrounded first by a cylindrical guard 6, then a cylindrical ground electrode 7. The guard 6 and ground electrode 7 extend through the MI cable, surrounding the centre electrode along it. The insulating material is silicon dioxide, and the outer sheath is typically Inconel 600. At end of the MI cable distal the engine sensor 4, the ground electrode 7 is connected to earth. The outside of the output lead 9 forms a hermetic seal with the casing of the engine sensor 4. This is to prevent water entering the inside of the sensor casing and thereby affecting its effectiveness and/or longevity.

In operation, an electric field is set up between the electrode 5 and the ground 7. This field must be linear to maintain accuracy of the sensor. The guard acts to protect this field. It creates an additional field around the centre electrode 5 that is driven at the same phase and voltage as the centre electrode 5. This additional field then protects the region from becoming warped and cancels any stray capacitance between the centre electrode 5 and the ground electrode 7.

As the blades pass through the electric field, the capacitance of the electrode 5 and the ground 7 changes. These changes are monitored by the data processing means allowing it to assess blade tip clearance.

The sensor output passes through an output lead casing or conduit 11 which is fixed to the outside of the engine casing. The output lead casing or conduit is a metal tube 11. The sensor output MI cable 9 is supported within the metal tube by metallic internal metal supports 12. These have holes 13 which permit the flow of fluid (typically cooling air) through them and thence along the tube and over the surface of the MI cable. The end 14 of the tube distal from the sensor 1 has a cooling air inlet 15 which is connected to a supply (not shown in figures) of cooling air. In a particular embodiment of the invention, that supply of cooling air might be the same supply as that which supplies cooling air to the turbine casing. It is known to cool a turbine casing to reduce its expansion as it heats. Such expansion can increase the tip clearance and thereby reduce the engine efficiency. The tip clearance measurements from the probe of the current invention could be used to control the supply of cooling air to the turbine casing. When the tip clearance increases because of the thermal expansion of the turbine casing, the turbine cooling system could be turned on to cool the casing and thereby reduce the tip clearance.

The metal tube that forms the output lead casing or conduit 11 is made from a stainless steel, corrugated tube forming a bellows-like structure. Referring to FIGS. 7a and 7b, the stainless steel tube has corrugations 22 along its length (in FIGS. 7a and 7b they are only shown at the ends). This casing is protective and resistant against collapse from external, inward forces. It is also flexible, so can be handled in the same manner as the cables within it.

The end 16 of the tube proximal the sensor 1 includes proximal holes 17 arranged to form an output for air from the metal tube 11. That output may be arranged so that the air exiting the tube 11 passes over the body of the sensor 1 and thereby helps cool the sensor. Although the cooling air exiting the tube 11 will have been warmed as it cools the MI sensor output cable 9, it is likely to still be cooler than the sensor 1.

The invention claimed is:

1. An engine probe system for monitoring a moving engine element, the system comprising:
   a capacitive engine sensor including a sensing electrode defining one of the electrodes of a capacitor; and
   an output lead for coupling the engine sensor to data processing means for monitoring changes in the capacitance of the capacitor including the sensing electrode, wherein the output lead includes a first end coupled to the engine sensor;
   a first conductor for electrically connecting the sensing electrode to the data processing means; and
   an insulation jacket surrounding at least a portion of the first conductor;
   wherein the engine probe system includes a conduit separate from and outside the engine sensor and surrounding at least a portion of the output lead insulation jacket and defining a fluid passage between the insulation jacket and the conduit.

2. An engine probe system according to claim 1 wherein the conduit is a flexible tube.

3. An engine probe system according to claim 2 wherein the capacitive sensor includes a centre first electrode coaxial with and separated from an outer electrode, the centre and outer electrodes defining the electrodes of the capacitor, and the output lead including a second conductor for connecting the outer electrode to the data processing means, and wherein the insulation jacket surrounds the second conductor.

4. An engine probe system according to claim 3 wherein the second conductor connects the outer electrode to ground.

5. An engine probe system according to claim 1 wherein the conductor or conductors, and the insulation jacket are formed by mineral insulated (MI) cable.

6. An engine probe system according to claim 1 wherein the conduit is spaced from the output lead insulation jacket by spacer elements.

7. An engine probe system according to claim 6 wherein the spacer elements between the flexible conduit and the output lead insulation jacket have apertures therethrough to allow the passage of a fluid.

8. An engine probe system according to claim 1 wherein the conduit is a metal tube.

9. An engine probe system according to claim 1 wherein the conduit includes a fluid inlet at a first conduit portion distal from the sensor, and a fluid outlet at a second conduit portion proximal to the sensor.

10. An engine probe system according to claim 1 wherein the outlet is arranged so cooling fluid exiting therefrom passes over the sensor.

11. The engine probe system according to claim 1 wherein the conduit extends solely between the engine sensor and the data processing means.

12. An engine probe system for monitoring a moving engine element, the system comprising:
   a capacitive engine sensor including a sensor casing housing a sensing electrode defining one of the electrodes of a capacitor;
   an output lead for coupling the sensor casing to data processing means remote from the sensor for monitoring changes in the capacitance of the capacitor including the sensing electrode, wherein the output lead includes a first end coupled to the sensor casing;
   a first conductor for electrically connecting the sensing electrode to the data processing means; and
   an insulation jacket surrounding at least a portion of the first conductor;
   wherein the engine probe system includes a conduit separate from and outside the sensor casing, and surrounding at least a portion of the output lead insulation jacket and defining a fluid passage between the insulation jacket and the conduit.

13. The engine probe system according to claim 12 wherein the conduit extends solely between the sensor casing and the data processing means.

* * * * *